Figure 1:
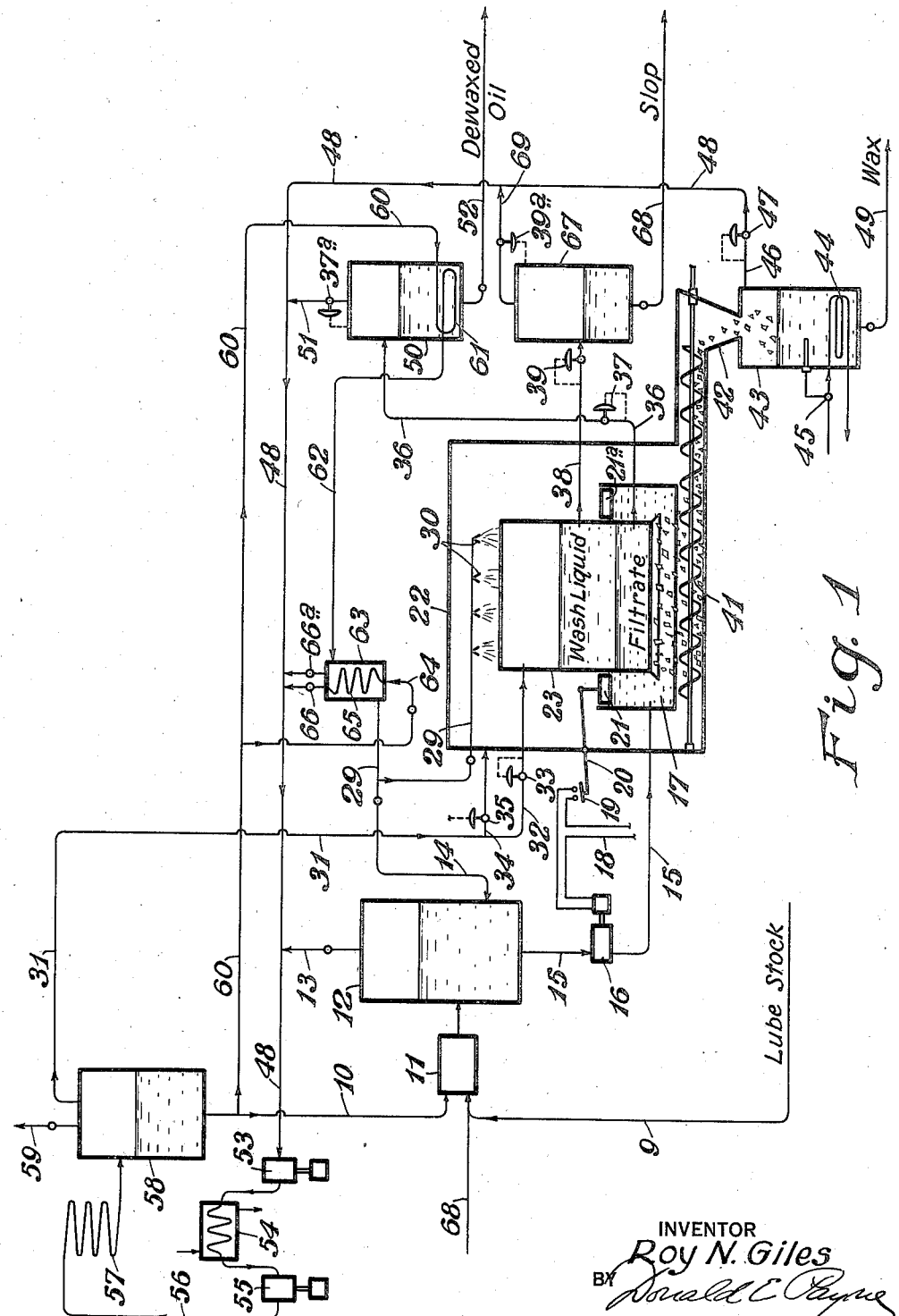

Patented May 25, 1937

2,081,398

UNITED STATES PATENT OFFICE 2,081,398

METHOD OF OPERATING A CONTINUOUS FILTER SYSTEM

Roy N. Giles, Highland, Ind., assignor to Standard Oil Company, Chicago, Ill., a corporation of Indiana Application March 14, 1936, Serial No. 68,850

16 Claims. (Cl. 210—199)

The object of my invention is to provide a practical and efficient method and means for operating a continuous process of filtering wax bearing oils in very light solvents.

A further object of my invention is to provide a system of automatic temperature and pressure controls in a continuous wax filtration system which will prevent the deposition of wax in the filter element and which will insure a continuous rapid filtration. A more specific object of the invention is to maintain the pressure inside of the filter element equal to or slightly above the vapor pressure of the filtrate corresponding to its temperature so that flashing of the filtrate in the filter element will be prevented. A further object is to maintain a substantially uniform pressure differential across the filter element irrespective of temperature changes in the filter slurry. A further object is to provide an improved method and means for operating a propane dewaxing filter and all features thereof as will be hereinafter described.

In a propane dewaxing filter system the propane-oil solution which passes through the filter element is of necessity saturated with wax. Therefore the evaporation of solvent from this filtrate may cause the precipitation of wax. If this precipitation takes place within the filter element it is obvious that the pores of the filter will become plugged with wax, thereby rendering it progressively more and more impervious to the passage of liquid. The filter rate is correspondingly diminished, the efficiency of the filter is lowered and the wax cake becomes so thin as to be almost negligible. An object of my invention is to avoid this plugging of filter elements.

A further object of my invention is to operate a continuous filter without the use of any pressuring gas other than the vapor of the solvent itself.

In practicing my invention a wax slurry which has been chilled to dewaxing temperature is introduced into the bowl of a continuous filter. Pressure is exerted upon the surface of the slurry by solvent vapors which are introduced in quantities determined by temperature and pressure conditions in the filter. The pressure differential across the filter element is maintained at a relatively low value, about 2–8 pounds per sq. in., and the pressure on the filtrate side is maintained at a high enough value to prevent flashing of the filtrate. The cake which is built up on the filter element is gradually dried as the element rotates toward the wax discharge mechanism, the propane vapors which condense on the surface of the wax cake being sufficient to wash the bulk of the oil from the cake but being insufficient to dissolve any appreciable amounts of wax. The wax cake may, of course, be washed with a cold propane spray if the condensation of propane gas is not sufficient to remove the bulk of the oil therefrom.

An important feature of my invention is the use of automatic regulators for resetting the pressure conditions in the filter in accordance with temperature conditions therein, for insuring a constant pressure differential across the filter element irrespective of temperature conditions, for preventing the flashing of filtrate inside the filter element, and for obtaining smooth operation with all of these automatic regulations. By providing these inter-related automatic controls I not only insure the successful continuous filtration of wax but I make the operation foolproof.

Figure 2:
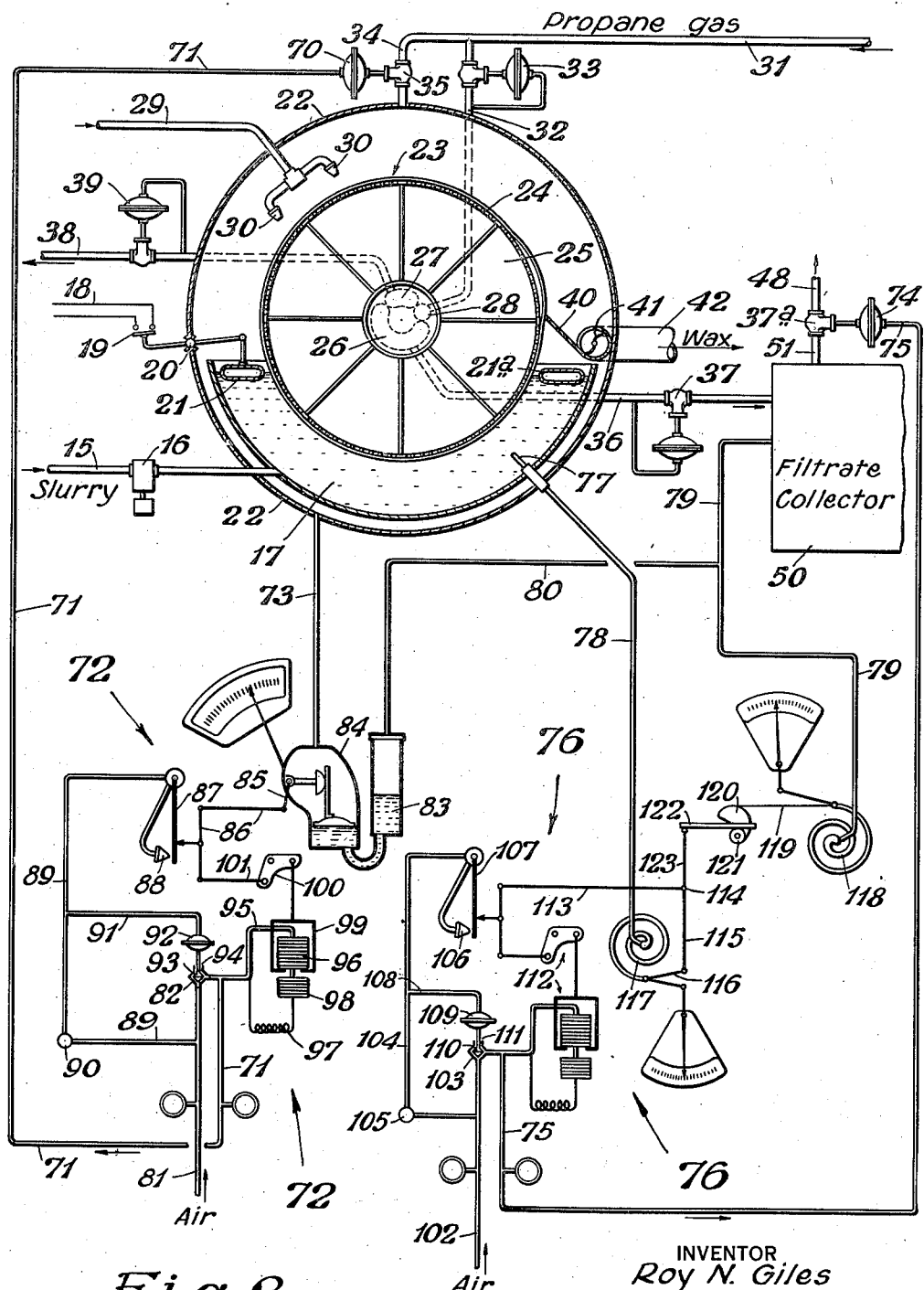

In the accompanying drawings which form a part of this specification and in which similar parts are designated by like reference characters in the several views, Figure 1 is a diagrammatic plan of my improved filter system; and Figure 2 is a diagrammatic sectional view of the filter together with a diagrammatic elevation of the automatic temperature and pressure control system.

In describing my invention I will refer to propane as a diluent but it should be understood that this is merely an example of light normally gaseous diluents and that I may use butane, ethane, propylene, butylene, methyl chloride, methyl ether, etc. or equivalent substances, either alone or in admixture with each other. The present invention is not dependent upon the use of any particular diluent but relates to an improved method and apparatus for employing any normally gaseous or easily condensable diluent.

The invention will be described as applied to an S. A. E. 50 distillate lubricating oil stock prepared from Mid-Continent crude, but it should be understood that the invention is equally applicable to any wax-bearing oil whether it is a distillate or residual stock and whether or not it has been acid treated, solvent extracted, clayed, etc.

The waxy lubricating oil stock is introduced through line 9 and propane is introduced through line 10 to a wax crystallizing system 11. In this system the oil stock may be dissolved in the propane and may be chilled by auto-refrigeration or any other means as described in my prior Patent No. 1,943,236. The particular method of chilling forms no part of the present invention and it is sufficient to point out that a filterable propane-oil-wax slurry may be obtained by any known process and introduced into wax slurry feed tank 12 which acts as a supply reservoir for the slurry which is charged to the filter. This slurry preferably contains about one part of oil to two parts of propane by volume and is maintained at a temperature of about −40° F. The low temperature may be maintained by removing propane vapors through line 13 and propane sufficient to provide this cooling and to supply the necessary diluent may be introduced through line 14 from a cooled propane source.

The filterable wax slurry is transferred from tank 12 through line 15 by pump 16 to the feed bowl 17 of a continuous filter. The motor which drives pump 16 is actuated by power from line 18 in which there is a switch 19 opened and closed by a mechanism 20 operated by float 21 which is in turn supported on the surface of the slurry in feed bowl 17. When the level of the slurry falls to a predetermined position the switch turns on the motor and introduces more slurry into the feed bowl until the float reaches an upper position at which the circuit is automatically broken and the motor is stopped. It should be understood that this description is only illustrative and that any well-known mechanism may be employed for regulating the feed into the filter bowl to maintain a substantially constant liquid level therein. Floats 21 and 21a serve the additional function of protecting the surface of the slurry from the warmer blow-back gases which are used as a pressure medium; the use of floats prevents the slurry from being warmed up by such condensation.

The continuous filter (see Figure 2) may be any well-known type and as a preferred example I will describe the use of a cylindrical filter having an insulated gas tight pressure casing or shell 22 enclosing a drum 23 having a filter element 24 on its periphery and provided with segments 25 connected by sliding ports first to the filtrate discharge slot 26, then to the wash liquid slot 27 and finally to the blow back slot 28. Cold wash propane is introduced through pipe 29 and may be sprayed onto the cake through perforated pipes or nozzles 30.

The pressure is maintained between the filter shell and the drum by means of propane gas from line 31. A portion of this gas is introduced through line 32 as blow-back to facilitate cake discharge, the amount of gas introduced being controlled by automatic pressure regulator 33. The bulk of the pressure gas is introduced directly between the shell and the filter element through pipe 34 regulated by pressure regulating valve 35.

Filtrate may be withdrawn through pipe 36 in amounts controlled by pressure regulating valve 37, although I prefer to operate by leaving this valve completely open. Wash propane may be withdrawn through pipe 38, through pressure-regulated valve 39. The pressure in these lines is preferably controlled after operation is under way, by pressure-controlled valves or vapor discharge pipes which lead from storage tanks to which pipes 36 and 38 are respectively connected. The wax cake is removed from the filter element by scraper 40 and conveyed by scroll conveyor 41 through conduit 42 to a wax pot.

An outstanding feature of my invention is the careful control of pressure in the various parts of the system, so that the evaporation and condensation of propane can be controlled to supply the necessary refrigeration and pressure differentials without impairing the cold test of finished oils, plugging the filter elements, etc. I have discovered that when large pressure differentials are employed in a system which uses exclusively a condensable gas like propane, the high pressure causes an excessive condensation of the propane in the wax slurry, and particularly on the wax cake which warms up the cake, redissolves wax, and carries the wax into and through the filter element. I have also discovered that if the pressure on the filtrate side is not maintained above the vapor pressure of the filtrate there will be a flashing diluent from the inner filter surface which will cause a deposition of viscous oil and wax in the pores of the filter, thereby clogging the filter and impairing, if not actually stopping, the flow of diluted oil or wash liquid therethrough.

In practicing my invention I preferably maintain a small differential, about two to eight pounds, between the outside and inside of the filter element and I maintain the pressure on the inside of the filter element higher than the vapor pressure of the filtrate. Thus if the average temperature of the slurry is −15° F. and if the theoretical vapor pressure of the slurry is 16 pounds, I maintain a pressure inside the rotating drum ($P_1$) of 16.8 pounds and I maintain a pressure between the filter element and the filter shell of 20 pounds, giving a filtering pressure differential of 3.2 pounds. Under these conditions a uniform wax cake is formed at all times and filtration can be continued indefinitely giving filter rates upwards of three gallons of dewaxed oil per square foot of filtering area per hour. If an attempt is made to operate a system of this type with a pressure inside the drum ($P_1$) less than the vapor pressure of the filtrate, evaporation of diluent will occur both from the filtrate and from the inner surface of the filter cloth and filtration will practically cease.

Although I do not use extremely high propane pressures between the shell and drum, these pressures are higher than the vapor pressures of the slurry and unless there is little or no space between feed bowl 17 and drum 23 I prefer to use floats 21A to cover the surface and prevent the condensation of propane gas in the wax slurry.

Another important feature of my invention is the utilization of gases in the shell (from the blow-back gas, wax pot, filter slurry, etc.) to effect the final washing of the filter cake. Since the gas in the shell is at slightly higher pressure than the vapor pressure of the wax cake composition there will be a slight condensation of this gas throughout the entire surface of the wax cake which is exposed. This surface condensation takes place in a very short interval of time and the amount of wax dissolved is negligible. The condensation occurring first only on the surface of the wax cake, it is sufficient to drive the last remaining wash liquid out of the wax cake. This use of gas in the shell to supply wash liquid has been found to greatly improve the quality of the cake and to facilitate an even, uniform cake discharge.

Referring once more to Figure 1, the wax cake which is forced by scroll 41 through conduit 42 to wax pot 43 is melted in said wax pot by steam coil 44, the amount of steam being regulated by thermostatically controlled valve 45. Propane vapors are withdrawn through pipe 46 through pressure-controlled valve 47 and low pressure gas line 48. Wax is withdrawn from the base of the pot through pipe 49. An important feature of this arrangement is the countercurrent use of propane gas flowing back through conduit 42 toward the filter. This propane gas is condensed by the approaching wax slurry, so that the wax slurry is both warmed and diluted, thereby minimizing the amount of work required by the scroll. In fact, a portion of the propane between the filter shell and drum may come from this wax scroll system; thermostatically controlled valve 45 and pressure-controlled valve 47 may play an important part in maintaining the required gas pressure in the filter shell.

The filtrate is introduced by pipe 36 to collector tank 50 from which vapors are vented through line 51 and pressure-controlled valve 37a to low pressure gas line 48. When the filter is just beginning to operate it may be necessary to employ pressure control 37, but during the normal operation I prefer to open valve 37 and to employ the pressure control on valve 37a. The cold filtrate is warmed by a heat exchange which will be hereinafter described and this warmed filtrate is then passed by means of pipe 52 to suitable stills for removing diluent which is condensed and returned to diluent storage in the conventional manner.

Gases from low pressure gas line 48 discharge into the inlet side of compressor 53. This compressor discharges to intercooler 54 and the cooled gases from the intercooler are then passed through compressor 55, line 56 and condenser 57 to propane storage tank 58. Intercooler 54, between stages of compression lessens compression costs to a considerable extent.

The pressure in propane storage tank 58 is maintained within safe limits by a suitable safety valve in line 59 which may lead to fuel gas lines, absorption systems, compressors, etc. This may be used to purge out any air that may be drawn into the system.

Propane is passed through liquid line 60 to cooling coils 61 in filtrate receiver 50, so that the refrigeration value of the filtrate may be utilized. The cooled propane may then be passed through line 62 to cooler 63 which is cooled by the vaporization of propane introduced through pipe 64, vaporized in coils 65 and released through valve 66 to low pressure gas line 48. The propane in cold propane tank 63 supplies the propane for washing the filter through pipe 29 and supplies propane for cooling and diluting the wax slurry through line 14. I may, of course, effect cooling in tank 63 by venting vapors directly therefrom to low pressure gas line 48 through valve 66a.

The wash filtrate from the filter is introduced by pipe 38 to storage tank 67 which may be provided with a heat exchanger similar to that described for tank 50. The wash filtrate removed from the base of this tank through line 68 may be combined with the filtrate or admixed with incoming lubricating stock for further dewaxing, but it may, of course, be dewaxed in a separate system or utilized for some purpose which does not require as low pour point as the main filtrate. It should be understood, of course, that some of the washed liquid may be removed with the filtrate and/or that the wash filtrate may be separated into various fractions of increasing wax content. This may be effected by adjusting ports 26, 27, etc., as is well known to those skilled in the art. Vapors may be removed from wash filtrate storage tank 67 through pressure-controlled valve 39a and pipe 69 to low pressure gas line 48.

The modification of my invention hereinabove described offers the important advantage that no fractionation or rectification systems are necessary to separate the shell gas from vaporized diluent. By employing one and the same material for diluent and shell gas I have greatly simplified the necessary equipment and by employing the critical pressures hereinabove described I obtain excellent yields of low pour point oils and I obtain dry wax cakes which are readily discharged from the filter, so that the entire process may be carried out in a continuous and very satisfactory manner. Using diluent ratios of about 3 to 1, filter pressure differentials of about 3 pounds per square inch, operating the filter at about ¼ revolution per minute to form a cake of about ⅛ to ¼ inch thickness, I can obtain filter rates of from 1 gallon to upwards of 4 gallons of oil per square foot of filter area per hour.

An extremely important feature of my invention is my means for automatically controlling pressures in various parts of the system and for insuring continuous smooth operation of the filters regardless of temperature fluctuations, changes in the nature of the feed stock, etc. A preferred example of my automatic regulating means is illustrated in Fig. 2 and will be hereinafter described in detail.

Instead of inserting pressure diaphragm 70 immediately between valve 35 and shell 22 I connect it by pipe 71 through automatic control means 72 and pipe 73 to shell 22. Similarly, instead of connecting diaphragm 74 directly from valve 37a to filtrate collector 50, I connect it through pipe 75 to automatic regulating means 76 which is also partly controlled by the temperature of the wax slurry (and consequently the filtrate) by means of thermometer bulb 77 and tube 78. Regulating means 76 is connected by pipe 79 to filtrate collector 50 and regulating means 72 is connected by pipe 80 thereto.

Referring to regulating means 72—let us assume that the pressure in the filter shell is too low: Then air from air supply 81 is supplied through valve seat 82 and pipe 71 to pressure diaphragm 70 where it acts to turn on valve 35 and admit propane gas from pipe 34 into the filter shell. As the pressure in the shell builds up, the pressure transmitted through line 73 causes the displacement of mercury 83 in the manometer and the lowering of the float in chamber 84. The lowering of the float in chamber 84 causes clockwise motion of crank 85 which is connected by links 86 to a flapper member 87, the transmitted movement tending to urge flapper 87 against nozzle 88. This nozzle is connected through line 89 and regulating valve 90 to the air supply line 81, and as the flapper approaches nozzle 88 it tends to build up pressure in line 89 which is transmitted through line 91 to diaphragm 92, thereby causing valve member 93 to uncover the port 94 and to cover valve seat 82. This shuts off the air supply from line 71 and diaphragm 70 and allows the air from this diaphragm to be vented out through vent 94.

The mechanism above described may tend to function abruptly (although it is preferably designed so that valve 93 is "floating" and neither valve seat 82 nor vent 94 is ever entirely closed). To insure smooth operation I connect line 71 with low resistance line 95 to bellows 96 and through relatively high resistance line 97 to bellows 98. Between the two bellows and actuated thereby is a yoke member 99 connected to crank 100, which is in turn connected by link 101 to link system 86. When valve 93 tends to suddenly cover valve seat 82 there is an immediate release of pressure through vent 93, thereby causing collapse of bellows 96 and an upward movement of yoke 99 which turns crank 100 counter-clockwise and tends to open flapper 87. As hereinabove described, the opening of flapper 87 tends to relieve the pressure in lines 89 and 91, and this in turn tends to open valve 94 or remove it from valve seat 82. After this first impulse there is a gradual movement of yoke 99 in a downward direction because of an equilibrium in pressure obtained in lines 95 and 97. The effect of the cooperating bellows connected through high and low resistance lines 97 and 95 respectively is thus to prevent abrupt movements of valve 94 and to thereby insure smooth operation of the pressure control mechanism.

As the pressure is gradually lowered in shell 22 float member 84 will rise and tend to pull flapper 87 from nozzle 88, thus decreasing the pressure in lines 89 and 91 and opening valve 93 so that the compressed air can again act on diaphragm 70 and open valve 35. Since one leg of the manometer is connected to the shell chamber outside of the filter element through line 73, and the other leg of the manometer is connected to the filtrate side of the filter (through the filtrate collector), through line 80, it will be seen that automatic pressure regulating means 72 maintains a constant pressure differential across the filter element.

The function of regulating means 76 is to maintain sufficient pressure on the filtrate side of the filter element to prevent the flashing of propane, even though the temperature of the filtrate may vary. Air from supply line 102 is passed through valve seat 103 and line 75 to react on diaphragm 74 and open valve 37a. Air supply line 102 is also connected through line 104 and regulating or resistance valve 105 to nozzle 106, which directs a jet of air against flapper 107. When this flapper approaches nozzle 106 pressure is built up in line 108 which causes diaphragm 109 to urge valve 110 against seat 103, simultaneously opening vent 111 so that the pressure is relieved on diaphragm 74 through line 75 and vent 111. The stabilizing means 112 employed in this system is the same as that hereinabove described as elements 95 to 101, inclusive, and further description is believed unnecessary.

Flapper 107 is controlled by linkage system 113 pivotally connected at 114 at an intermediate point of link 115. One end of link 115 is pivotally connected to link 116 actuated by temperature-controlled element 117 which is in turn connected by tube 78 to mercury bulb 77. When the temperature of the oil wax slurry is increased, the expansion of liquid in bulb 77 transmits pressure thru tube 78 to cause element 117 to pull link 116 to the left, this tending, in turn, to urge the flapper 107 against nozzle 106. Thus an increase in temperature tends to cause valve 110 to close on valve seat 103, which in turn causes diaphragm 74 to close valve 37A so that the pressure on the filtrate will be increased corresponding to the higher temperature. Since this same pressure operates through line 80 on regulating means 72 it is undesirable to have it rise too high or fluctuate too greatly, and I therefore provide a means for opening valve 37A when the pressure has been increased the desired amount.

The pressure on the filtrate collector is transmitted through line 79 to element 118, which may be a Bourdon tube. The end of element 118 is connected by wire 119 to a rotatable cam 120 to which a pinion 121 is integrally attached. A rack 122 is operated by pinion 121 which is pivotally connected at 123 with one end of link 115. The shape of cam 120 is designed to correlate the temperature of propane solutions with its vapor pressure to that a pressure change causing a motion of wire 119 will cause a motion of element 122 which is proportional to and in the same units as the corresponding temperature change.

For practical purposes, however, it is usually sufficient to connect element 118 to the end of link 115 directly by link 119, avoiding the necessity of using the cam 120, pinion 121 or rack 122. When the pressure gets too high in filtrate collector 50 element 18 pulls cam 120 in a clockwise direction, thereby causing rack 122 and link 115 to move to the right, tending to pull flapper 107 away from nozzle 106. This causes valve 110 to open and allows the air supply from line 102 to flow through line 75 and act on diaphragm 74 to open valve 37A.

If the pressure in filtrate collector 50 gets so low that there is danger of vaporizing propane in the filter element, the end of Bourdon tube 118 will move to the left, causing rack 122 and elements 115, 114 and 113 to likewise move to the left and this urges flapper 107 against nozzle 106, which tends to build up pressure in line 108, thereby moving valve 110 toward a closed position, diminishing the air supply to diaphragm 74 and thereby tending to close down valve 37A.

From the above description it will be seen that automatic control means 76 maintains a pressure on the filtrate side of the filter element, which corresponds to the temperature of the filter slurry or filtrate. This pressure is preferably one or two pounds higher than the vapor pressure of the filtrate at any given temperature. The pressure differential across the filter element is maintained by automatic control means 72 which regulates valve 35 to allow the introduction of sufficient propane gas to maintain a pressure differential of preferably about one to eight pounds. My apparatus is entirely automatic; it insures a substantially constant pressure differential for filtering and it also insures a sufficiently high pressure on the filtrate side to prevent vaporization of propane in the filter element, which in turn would cause plugging of the filter element.

The modification of my invention hereinabove described offers the important advantage that no fractionation or rectification systems are necessary to separate propane from some other pressuring gas. By employing one and the same material for diluent and pressuring gas I have greatly simplified the necessary equipment and by employing the range of pressures hereinabove described I have obtained excellent yields of low pour point oils. I obtain dry wax cakes which are readily discharged from the filter, so that the entire process may be carried out in a continuous and highly satisfactory manner.

Using diluent ratios of about 3 to 1; filter pressure differentials of about 3 pounds per square inch; operating the filter at about one-fourth revolution per minute to form a cake of about one-eighth to one-fourth inch thickness, I obtain filter rates of from one gallon to upwards of four gallons of oil per square foot of filter area per hour.

While I have described in detail a preferred embodiment of my invention, it should be understood that I do not limit myself to any of the details hereinabove set forth, except as defined by the following claims which should be construed as broadly as the prior art will permit.

I claim:

1. A control system for a propane dewaxing filter which comprises a filter shell, a filter element in said shell forming a shell chamber between said element and said shell, and a filtrate chamber inside of said element, a valve for controlling the introduction of propane into said shell chamber, automatic means for operating said valve in accordance with pressure differential between said shell chamber and said filtrate chamber, a valve for releasing propane vapors from said filtrate chamber, and means connected with said propane releasing valve for controlling the pressure in the filtrate chamber in accordance with the temperature of the slurry undergoing filtration.

2. An apparatus for continuously filtering solids from liquefied gases which comprises a closed filter chamber, a filter element in said chamber, a filtrate collector connected to the inside of said filter element, means for introducing a slurry of solids in liquefied gases into said chamber, means for separately introducing condensable gases into said chamber for effecting pressure for filtration, means connected with the space in the filtrate side of the filter element and with the space in the filter chamber for maintaining a substantially constant filtering pressure differential and means including a pressure responsive element connected with the space in the filtrate side of the filter element and a temperature-controlled element in contact with the slurry of solids for maintaining a pressure on said filtrate side higher than the vapor pressure of the filtrate so that the pressure on the filtrate is set by the temperature of the slurry, the filter chamber pressure being varied with the temperature of the slurry, and the filtering pressure substantially constant regardless of variations in slurry temperature.

3. In continuous filter control means for a propane dewaxing plant, a gas-tight filter shell, a filter element inside said shell, means for maintaining a propane-wax slurry in the lower part of said shell and in contact with said filter element, means for introducing propane into said shell for supplying a pressuring fluid, a mechanically-operated valve for varying the release of pressure on the filtrate side of the filter element, a mechanically-operated valve for varying the amount of propane introduced into the shell, a control means connected with the space in said shell and with the filtrate side of said filter element for controlling the operation of the propane-introduction valve, and a second control means including a temperature-operated element connected with the filter slurry and a pressure-operated element connected with the filtrate side of said filter for controlling the operation of the pressure-releasing valve.

4. The method of operating a pressure filter provided with an outer shell, a filter element and means for introducing a pressure gas, for introducing and withdrawing filter slurry and for withdrawing filtrate, which method comprises introducing a filter slurry, introducing a condensable gas to supply the pressure necessary for filtration, and keeping the condensable gas out of direct contact with a substantial part of the upper surface of the filter slurry so that condensation of said gas in said slurry will be prevented.

5. In apparatus of the class described, a closed pressure filter enclosed in a casing, a feed bowl in said filter, a rotatable filter element immersed in said feed bowl, means for introducing a condensable pressure gas between said filter element and said casing, and a float adapted to rest on the surface of the slurry between the edge of the feed bowl and the filter element, said float being of substantially the same area as the upper surface of the slurry whereby it will minimize the exposed filter slurry surface so that undue condensation of diluent gases in said diluent slurry is prevented.

6. In an apparatus for dewaxing wax bearing oil, a closed pressure filter, a filter element within said pressure filter, means for introducing a slurry containing wax in suspension into the lower portion of said pressure filter, means for introducing a gaseous substance into the upper portion of said pressure filter and means substantially at the surface of contact between the slurry and the gaseous substance between said pressure filter and said filter element, said means being adapted to minimize the surface of the slurry exposed to the gaseous substance.

7. In an apparatus for dewaxing wax bearing oils, a closed pressure filter, a rotatable filter element within said pressure filter, means for continuously introducing a wax containing slurry into the lower portion of said pressure filter, means for introducing a gaseous substance into the upper portion of said pressure filter, and means substantially at the surface of contact between the slurry and the gaseous substance between the periphery of the filter and the filter element, said means being adapted to minimize the surface of the slurry exposed to the gaseous substance.

8. In apparatus of the class described, means for obtaining a filterable propane-oil-wax slurry, a continuous filter having a feed bowl, means for continuously introducing said slurry to said feed bowl, a pressure shell surrounding said filter, means for introducing propane into the space between said filter and said shell in amounts regulated by the pressure in said space, closed means for continuously removing wax slurry from said filter, means for melting said wax, vaporizing propane associated therewith and returning said propane under regulated pressure to said filter, means for continuously removing filtrate from said filter, and means for regulating the pressure in said filtrate removal means whereby the pressure on the filtrate side of the filter is above the vapor pressure of the filtrate but below the pressure of the space between the shell and the filter.

9. In apparatus of the class described, a continuous closed dewaxing filter, a wax pot for melting wax and vaporizing diluent therefrom, means for continuously removing wax from the filter and introducing it into said pot, said means being connected to a vapor space in said pot whereby diluent vapors may be returned to the filter countercurrent to the discharged wax cake, and means for regulating the pressure in said wax pot.

10. An apparatus for continuously filtering solids from liquefied gases which comprises a closed filter chamber, a filter element in said chamber, a filtrate collector connected to the inside of said filter element, means for introducing filter slurry and pressuring gases into said chamber, automatic means controlled by the pressure on each side of the filter element for maintaining constant pressure differential across said filter element even though the pressure in the filter chamber may vary, and automatic means including a temperature responsive element in thermal contact with material undergoing filtration and a pressure responsive element connected with said filtrate collector whereby the pressure in the filtrate collector is maintained just above that which would permit vaporization of liquefied gas in the filter element.

11. The apparatus of claim 10 which includes a valve for releasing gases from the filtrate collector and operative connections between said valve and the last named automatic means.

12. The apparatus of claim 10 which includes a valve in the pressuring gas introducing means and operative connections between said valve and the first-named automatic means.

13. An apparatus for continuously filtering solids from liquefied gases, which comprises a closed filter chamber, a filter element in said chamber, means for introducing a slurry of solids in liquefied gases into said chamber, means for separately introducing condensable gases into said chamber to maintain filtering pressure, means controlled by the pressure on each side of the filter element for controlling the amount of gases introduced and maintaining a substantially constant difference in pressure across the filter element, means for controlling the pressure on the filtrate side of the filter, means including a temperature-responsive element in contact with material being filtered for actuating said pressure-controlling means and a connection between said last two means whereby the pressure on the filtrate side of the filter is always greater than the vapor pressure of the filtrate at the temperature of filtration.

14. The control system of claim 1 wherein the automatic means includes a pneumatically-operated regulator so constructed and arranged that the introduction of propane is controlled to maintain a substantially constant filtering pressure differential.

15. The control system of claim 1 wherein the means connected with the propane releasing valve includes a pneumatically-operated regulator so constructed and arranged that the pressure in the filtrate chamber is controlled in accordance with the temperature of the slurry undergoing filtration.

16. The filter control means of claim 3 wherein both control means include pneumatically operated regulators so constructed and arranged that the introduction of propane is smoothly controlled in accordance with the temperature of the slurry and a substantially constant filtering pressure is maintained.

ROY N. GILES.